United States Patent [19]

Risman et al.

[11] 4,237,145
[45] Dec. 2, 1980

[54] METHOD OF PREPARING FOODSTUFFS CONTAINING COAGULATING PROTEINS AND A DEVICE FOR PERFORMING THE METHOD

[75] Inventors: Per O. G. Risman, Huskvarna; Nils E. Bengtsson, Mölnlycke, both of Sweden

[73] Assignee: Husqvarna Aktiebolag, Huskvarna, Sweden

[21] Appl. No.: 7,420

[22] Filed: Jan. 29, 1979

[30] Foreign Application Priority Data

Feb. 3, 1978 [SE] Sweden ................................. 7801280

[51] Int. Cl.³ ............................................... A23L 3/30
[52] U.S. Cl. .................................. 426/241; 99/450.7; 99/451; 219/10.55 A; 426/242
[58] Field of Search .................. 426/241, 242, 243; 219/10.55 A, 10.55 R; 99/450.7, 451

[56] References Cited

U.S. PATENT DOCUMENTS

| | | | |
|---|---|---|---|
| 3,469,996 | 9/1969 | Endres et al. | 426/241 |
| 3,963,892 | 6/1976 | Camph et al. | 219/10.55 M |

FOREIGN PATENT DOCUMENTS

| | | | |
|---|---|---|---|
| 2019012 | 4/1970 | Fed. Rep. of Germany | 219/10.55 A |
| 363462 | 9/1972 | Sweden. | |

*Primary Examiner*—Arthur D. Kellogg
*Attorney, Agent, or Firm*—Alfred E. Miller

[57] ABSTRACT

A method and apparatus for the treatment of protein containing foodstuffs wherein the foodstuffs are pumped in a microwave transparent tube through an applicator for exposure to microwave $TM_{021}$ energy. The foodstuffs may be in paste form. If the foodstuffs are eggs, the yolks and egg whites are pumped through concentric tubes before combination thereof in the applicator.

7 Claims, 5 Drawing Figures

METHOD OF PREPARING FOODSTUFFS CONTAINING COAGULATING PROTEINS AND A DEVICE FOR PERFORMING THE METHOD

This invention relates to a method and apparatus for preparing foodstuffs, wherein proteins constitute an essential part of the foodstuffs. It is known that such products become hard as a result of boiling or frying, and the reason for this change from soft to hard consistency is that, when heated, the proteins coagulate and bind the components of the product together. Coagulation may also be obtained by other types of heating, for example by microwave exposure.

Microwave heating methods and apparatus are known in which a material is conveyed through a heating zone and heated to a predetermined temperature. When the material is a liquid, it is moved through the heating zone in a tube transparent to microwaves. Such a device is disclosed in Swedish Pat. No. 363,462. In this device a cylindrical $TM_{021}$ applicator is used to form a heating zone in a rod-shaped load extending in the lengthwise direction of the applicator. Since the velocity of the flow in a tube is not the same at the periphery as in the center of the cross section of the flow due to friction, heating in the center of the tube must be more efficient than at its periphery. To achieve such distribution in the cross section the known applicator uses a field of the $TM_{021}$ mode, which has its maximum power density in the center and its minimum power density at the periphery. By this distribution of the power density over the cross section of the load, heating in some parts of the cross section to a greater extent than in other parts thereof, as well as overheating of peripheral parts, are avoided.

The calculation of the field pattern in a cylindrical load with considerable dielectric losses is complicated since it comprises complex Bessel-functions. Analyzing different types of applicators for heating a rod-shaped load reveals that the simplest and most common applicator having an oscillation pattern corresponding to the $TM_{01}$ wave type does not give the desired uniform heating and also does not allow sufficiently large load diameters, but that a $TM_{021}$ resonator has properties which solve the problem of overheating in some portions of the load cross section and permit greater load diameter.

As discussed in Swedish Pat. No. 363,462, the indices of a $TM_{021}$ wave have the following significances:

The First index (a zero), indicates that there is no field variation in the tangential component.

The second index indicates the number of minima of the E-field in the radial direction, counted from the axis toward the periphery. There is always a zero at the periphery, so that the lowest possible index is 1. Any minimum on the axis is not considered. In the instant situation, the index 2 therefor refers to the existence of two minima of the E-field in the radial direction.

The last index refers to the number of wavelengths in the axial direction of the standing wave, in the present instance this dimension therefore being one wavelength. When this index equals zero, it indicates that no variation of the field exists in the axial direction, whereby the wave type has special properties. Higher indices, however, constitute a measure of the length of the cylindrical cavity, and mean that the active zone and the treated quantity of material are increased.

Briefly stated, in accordance with the invention, a method is provided for producing a prepared product in a continuous process in which the initial material is a mass containing meat, fish, eggs or the like. An important property of this process is that the mass can be pumped and thus be continuously moved forwards in a tube. The prepared product, when leaving the tube after treatment in the applicator, is in the form of an extruded mass of hard consistency which can be handled in the same manner as a sausage. The apparatus for performing the method comprises a $TM_{021}$ applicator connected to a microwave source, and equipped with the control and connecting means required for the special use of the applicator.

In order that the invention will be more clearly understood, it will now be explained in greater detail with reference to the accompanying drawings, wherein.

Figure 1:
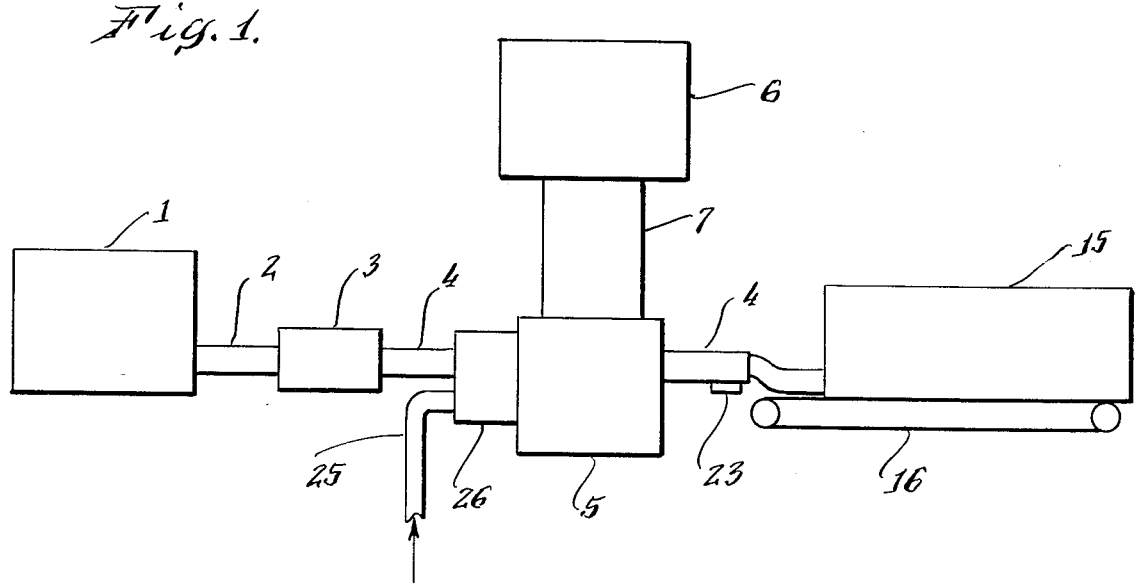
FIG. 1 is a block diagram illustrating, in simplified form, an apparatus in accordance with the invention.
Figure 2:
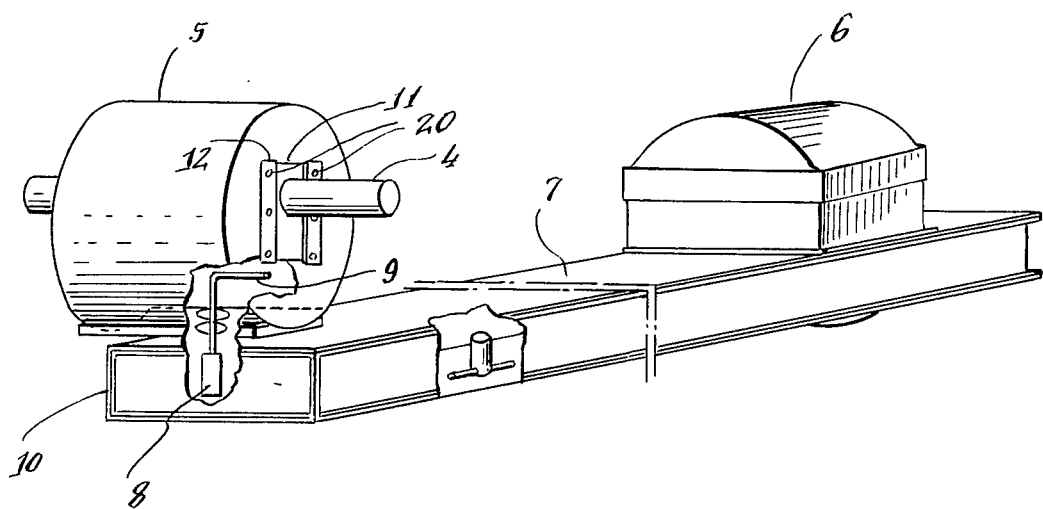
FIG. 2 is a simplified partially cross sectional view of a portion of the apparatus depicted in FIG. 1, showing the applicator, magnetron and the interconnecting waveguide.

As discussed above the initial material in the process according to the invention is a mass of meat or fish (or some other type of such paste). The process includes a plurality of steps for the treatment of this mass. A first step is the pumping of the mass, to force it to pass through a tube. The second step is heating of the mass in the tube by microwave exposure, causing its proteins to coagulate. The third step is discharging and handling of the thus coagulated product. All of these steps may comprise making measurements and adjustments which may depend largely on the dielectric properties of the mass being treated. Thus, different initial materials whose contents of water and/or fats differ considerably require totally different adjustment and adaptation of the microwave equipment.

On starting of the process the correct relation between pumping speed and power level/degree of coagulation must be determined. This can be done, for example, in such a way that the speed is adjusted continuously to a value which is acceptable according to experience, the power level being increased successively at the same time as the temperature of the mass is measured to prevent supply of excessive power. When the combination of pumping speed and power level is appropriate the process proceeds continuously with uniform coagulation in the entire cross section of the load and with good surface strength. To ensure that the preparation of the mass in the tube is even and without interruption it is important that coagulation occurs initially in the center and last at the periphery of the mass. Thus the paste forms a lubricant at the tube wall and reduces the friction in this part. If the heating is too great at the periphery there is also a risk that the mass will stick to the tube wall by scorching. This can completely stop the movement of the mass. To further reduce the friction at the tube wall a lubricant can be supplied through channels in the tube wall.

A special method which is also covered by the invention is the preparation of a so-called egg roll. This is formed of a coagulated cylinder of yolk surrounded by a likewise coagulated ring (i.e. hollow cylinder) of egg white. The product is known per se and the preparation starts with a separation step in which yolk and egg white are separated and fed to separate pumps. The special method is that liquid yolk and egg white are pumped through concentric tubes in a microwave applicator. The tube dimensions, microwave frequency and the shape of the end of the inner tube are selected such that an extrusion mass of yolk is pre-coagulated in the inner tube, and egg white is coagulated around the yolk after the flows have passed the end of the inner tube so that a continuous mass of egg roll is extruded at the discharge end of the applicator. The cross sectional shape of the extrusion mass can be circular, rectangular etc., according to choice, with the yolk located in the center or displaced laterally in a surrounding casing of egg white. As an alternative the yolk and the egg white can be pre-coagulated in separate concentric tubes, with fusing and final coagulation not occurring until the flows have passed the end of the inner tube, where there is direct contact between yolk and egg white. In both cases it is important that the power density distribution be directed radially so that in one case pre-coagulation of the yolk in the central tube can occur without hardening of the surrounding egg white and in both cases the final coagulation of the egg white at the contact surface between the egg white and the tube wall can be delayed to increase the pumping capability. The latter can be improved by pressing a lubricant in the form of vegetable oil or the like through channels in the tube wall to lubricate the inner surface of the wall. The method described for continuous boiling/extrusion of a continuous egg roll also allows continuous packing by simultaneous feeding of packing material in a manner known for example in the manufacture of sausages. To increase the shelf life of the product aseptic packing can be used.

In a corresponding manner the method permits continuous coagulation extrusion of yolk and egg white surrounding or embedded in emulsions of for example minced fish or meat, or coagulation of two or several concentric coatings of materials such as meat, fish, potatoes, etc.

The basic device for performing the methods discussed above is shown in FIG. 1, in which the parts are shown diagrammatically. A container 1 for the paste is connected by a tube 2 to a pump 3 pumping the paste continuously and uniformly through a tube 4. This tube is transparent to microwaves, and passes through a microwave applicator 5. The latter is of the type traversed by the flow and based on a theory of the electric field which is described in more detail in Swedish Pat. No. 363,462. The load, which is the prepared paste, is conveyed through the tube 4 near the axial center of the cylindrical applicator. The microwave source is a magnetron 6 connected to the applicator by a waveguide 7 from which a stub 8 and a coupling loop 9 transfer microwave energy to the applicator. Each end of the waveguide 7 is closed by a wall 10 (only one of which is shown).

Figure 3:
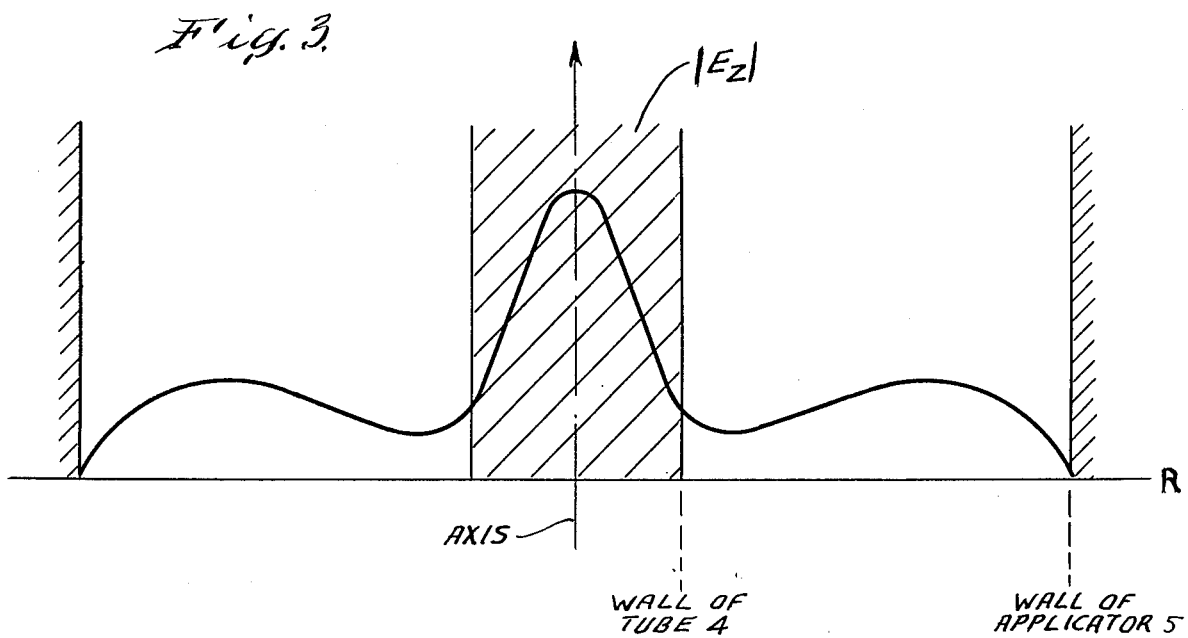
FIG. 3 illustrates the field pattern in the applicator and load, along a longitudinal section of the load.

The basic advantage of the applicator used is that the power density in the load can be calculated and directed by knowing its field pattern. In FIG. 3, the E-field is shown graphically in a cylindrical load disposed along the axial center of the applicator. The field pattern is theoretically chosen but practical tests show that satisfactory correspondence between theory and practice can be obtained. The energy is fed to the applicator by way of an inductive loop. Such a loop has at least two advantages: the field pattern is insignificantly affected by possible mismatches in the system and the field pattern is strongly bound by the position of the loop. It is evident that this coupling is important when feeding is effected by a magnetron, because the phase position of the mismatching of the magnetron varies very little on variation of the mismatching in the system due to changes of the size, temperature etc. of the load to be heated.

In practical tests with the applicator, it has been found to be advantageous to provide means for displacing the tubular load radially from the axial center, preferably in the direction away from the loop. By such displacement the field pattern can be centered to the axial center of the load and hence the field pattern becomes rotationally symmetric, i.e. so that the heating effect does not vary as a function of the angle, in the transverse cross section of the tube. This enables, practical application, the attainment of results that are very close to the theoretical, ideal field pattern, as shown in FIG. 3.

In the illustrated embodiment of the applicator the displacement capability of the load has been obtained by the use of a flange 11 disposed on the tube 4 at each location at which the tube passes through the end of the applicator 5 in a relatively large opening (not shown). That is, the tube 4 passes into and out of the applicator by way of openings that are substantially larger than the tube 4 itself, to enable a degree of adjustment in the position of the tube 4. As a consequence, the tube can be displaced laterally in the applicator 5, with the flanges 11 sealing these openings for microwave energy. The tube may be held in an adjusted position by means of two fasteners 12 on each end of the applicator, the fasteners 12 engaging the respective flange. Suitable screws 20 are provided on the fasteners 12 to enable the pressing of the flange against the end of the applicator. The position of the tube 4 at one end of the applicator can be adjusted independently of the position of the tube 4 at the other end of the applicator.

Figure 4:
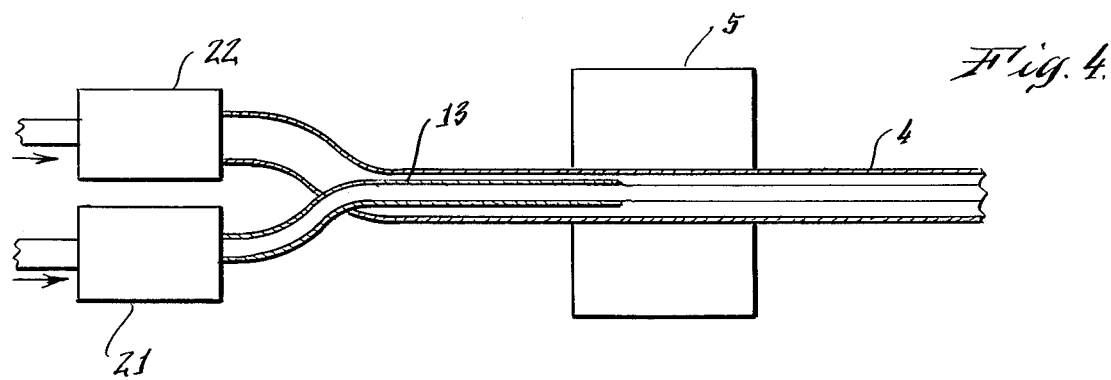
FIG. 4 illustrates a modification of a portion of the system of FIG. 1, wherein the feeding arrangement for the product comprises a pair of concentric tubes.
Figure 5:
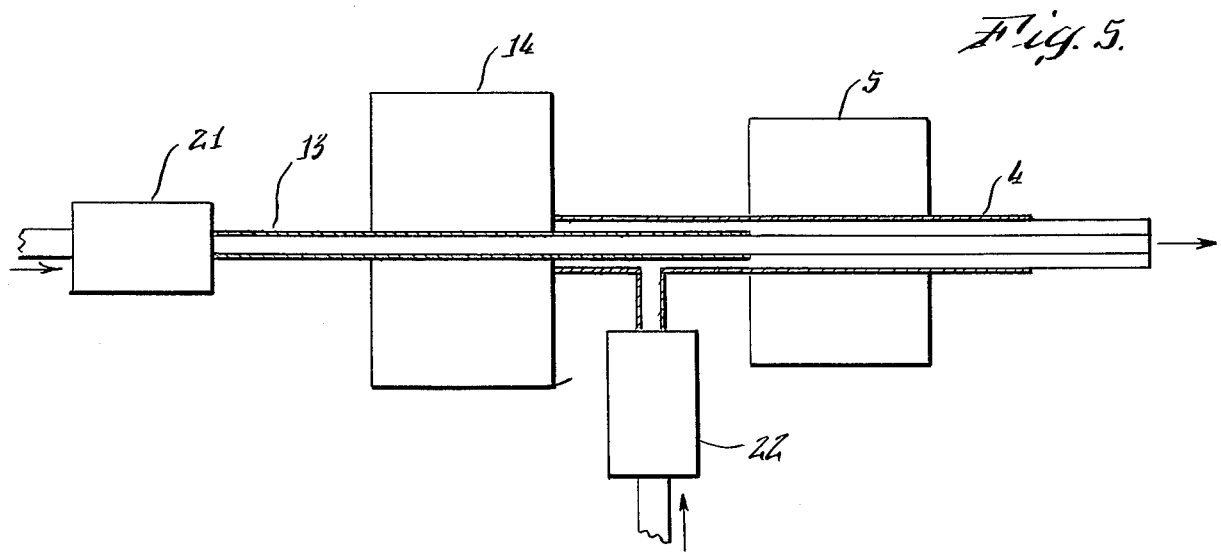
FIG. 5 is a block diagram of a modification of the system of FIG. 4, for a product composed of different masses.

Of course additional tubes and applicators can be included in the device, as seen in FIGS. 4 and 5. The described method of producing a so-called egg roll requires two concentric tubes, one for the yolk and one for the egg white. The inner tube 13 thereof can be telescopically drawn out (FIG. 5) and pass through a special applicator 14 provided for this tube. After extrusion the roll can be subjected to a posttreatment in an oven 15 or the like, in which case it is conveyed on a conveyor belt 16. Such a posttreatment apparatus can of course include units for different processes according to the product to be treated, surface treatment of the roll with hot air being one process, which improves the appearance of the product.

In the arrangements of FIGS. 4 and 5, separate pumps may be provided for the egg yolks and egg whites. Thus, yolk pumps 21 receiving egg yolks in the direction of the indicated arrows pump the egg yolks to the applicator, while pumps 22 pump the egg whites, the direction indicated by the arrows, to the applicator.

As above discussed, the process in accordance with the invention may involve the step of taking necessary measurements, for example, of temperature, in order to be able to adjust the operating parameters to achieve the desired conditions with a given material to be treated. As an example, for this purpose a suitable conventional temperature measuring device 23 may be provided on the tube 4 as it passes from the applicator 5, as shown in FIG. 1. In order to enable the introduction of lubricant into the inner periphery of the tube 4, a suitable lubricant may be introduced at a conduit 25 and pumped by means of a pump 26 through apertures (not shown) in the sidewall of the tube 4, at the time it enters the applicator 5. A packing material may also be introduced into the tube 4 in the same manner, for packing the product.

While the invention has been disclosed and described with reference to a limited number of embodiments it will be apparent that variations and modifications may be made therein and it is intended in the following claims to cover each such variation and modification as falls within the true spirit and scope of the invention. Modifications of this posttreatment as well as of the other methods and devices herein discussed are possible within the scope of the invention.

What is claimed is:

1. Method of preparing foodstuffs from a mass containing protein which coagulate during heating to impart hard consistency to the product, comprising the steps: pumping a paste of the mass enclosed in a tube transparent to microwaves to move the mass forward and to form it to an extrusion mass, exposing the extrusion mass to microwaves in at least one $TM_{021}$ applicator and discharging the exposed mass from the tube and transporting it therefrom in solid state, said step of exposing comprising exposing the extrusion mass in the $TM_{021}$ applicator to give maximum heat intensity in the center of a cross section through the extrusion mass and minimum intensity in the periphery of the cross section, and further comprising supplying a lubricant to the contact surface between the extrusion mass and the inner wall of the tube.

2. A method of preparing eggs comprising separating egg yolks from egg whites, pumping the egg yolks in an inner tube to an applicator; pumping the egg whites in an outer tube surrounding the inner tube to the applicator, the tubes being transparent to microwave energy and the inner tube terminating at least prior to exit of the product from the applicator; and exposing the pumped egg whites and egg yolks in the applicator to microwave $TM_{021}$ energy.

3. The method of claim 2 further comprising partially coagulating the egg yolks prior to application thereof to said applicator.

4. The method of claim 2 further comprising pressing a lubricant material through a channel in the wall of said outer tube to lubricate the inner wall thereof as said egg whites are moved through said applicator.

5. An apparatus for preparing foodstuffs comprising a tube transparent to microwave energy, means for pumping foodstuffs through said tube, a $TM_{021}$ applicator comprising a substantially cylindrical cavity, said tube passing generally axially through said cavity, a microwave source coupled to said cavity to expose foodstuffs in said tube to microwave energy, said tube having an inner cross sectional radius such that a given frequency of the microwave source the conditions for producing $TM_{021}$ resonance in the cavity are satisfied, and means at each end of said cavity for radially adjusting the position of said tube, and further comprising means coupled to said tube for applying a lubricant to the contact surface between the inner walls of said tube and any foodstuffs therein.

6. An apparatus for preparing foodstuffs comprising a first tube transparent to microwave energy, means for pumping foodstuffs through said first tube, a $TM_{021}$ applicator comprising a substantially cylindrical cavity, said first tube passing generally axially through said cavity, a microwave source coupled to said cavity to expose foodstuffs in said first tube to microwave energy, said first tube having an inner cross sectional radius such that at a given frequency of the microwave source the conditions for producing $TM_{021}$ resonance in the cavity are satisfied, means at each end of said cavity for radially adjusting the position of said first tube, a second tube within said first tube and concentric therewith, and further comprising a second pump means coupled to pump foodstuffs through said second tube.

7. The apparatus of claim 6 wherein said first-mentioned and second tubes are disposed telescopically, whereby said second tube terminates at least prior to the exit of said first-mentioned tube from said applicator, and further comprising a second applicator, said second-mentioned tube passing through said second applicator prior to entry thereof into said first-mentioned applicator, and means for exposing foodstuffs in said second tube in said second applicator to microwave $TM_{021}$ energy.

* * * * *